(12) United States Patent
Kikuchi et al.

(10) Patent No.: US 9,736,035 B2
(45) Date of Patent: Aug. 15, 2017

(54) METHOD AND APPARATUS FOR PROVIDING INFORMATION FOR SELECTING CLOUDS

(71) Applicant: FUJITSU LIMITED, Kawasaki-shi, Kanagawa (JP)

(72) Inventors: Shinji Kikuchi, Yokohama (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 296 days.

(21) Appl. No.: 14/608,636

(22) Filed: Jan. 29, 2015

(65) Prior Publication Data

US 2015/0256425 A1 Sep. 10, 2015

(30) Foreign Application Priority Data

Mar. 4, 2014 (JP) .................................. 2014-041246

(51) Int. Cl.
*G06F 15/16* (2006.01)
*H04L 12/24* (2006.01)
(Continued)

(52) U.S. Cl.
CPC ........ *H04L 41/5048* (2013.01); *G06F 9/5027* (2013.01); *G06F 9/5072* (2013.01); *H04L 41/5025* (2013.01); *H04L 67/10* (2013.01)

(58) Field of Classification Search
CPC ....... G06F 9/5072; G06F 9/5027; H04L 67/10
(Continued)

(56) References Cited

U.S. PATENT DOCUMENTS 5,339,435 A 8/1994 Lubkin et al.
8,271,655 B2 * 9/2012 Dawson ................ G06F 9/4856
709/226
(Continued)

FOREIGN PATENT DOCUMENTS

JP 5-197697 8/1993
JP 2006-99417 4/2006
WO WO 2010/137455 A1 12/2010

OTHER PUBLICATIONS

Rui Han et al. "Elastic-TOSCA: Supporting Elasticity of Cloud Application in TOSCA", Proceedings of the 4$^{th}$ International Conference on Cloud Computing, GRIDs, and Virtualization, Cloud Computing, 2013, 8 pages.
(Continued)

*Primary Examiner* — Hieu Hoang
(74) *Attorney, Agent, or Firm* — Oblon, McClelland, Maier & Neustadt, L.L.P.

(57) ABSTRACT

An information providing method includes: obtaining a template that defines one or more functions to be used; and extracting plural combinations that are used to implement the one or more functions, which are defined in the obtained template, from a data storage unit that stores, for each of computer resource providing services that provide one or plural functions, a performance indicator value for each of the one or plural functions. Each of the plural combinations includes a computer resource providing service and one or more functions in the computer resource providing service. The method further includes: calculating, for each plural combinations, a performance indicator value for the combination based on data in the data storage unit; and outputting, for at least one of the extracted plural combinations, the computer resource providing service, the one or more func-
(Continued)

| TEMPLATE ID | NUMBER OF RESOURCE COMBINATION | USED OFFERINGS | | | COST | AVAILABILITY INDICATOR VALUE | DIFFERENCE OF COSTS | DIFFERENCE OF AVAILABILITY INDICATOR VALUES |
|---|---|---|---|---|---|---|---|---|
| | | C1 | C2 | S1 | | | | |
| Temp2 | 1 | P2-Comp | P2-Comp | P2-Str | 315 | 99.498% | 205 | 1.488% |
| Temp2 | 2 | P2-Comp | P4-Comp | P2-Str | 205 | 99.875% | 95 | 1.865% |
| Temp2 | 3 | P4-Comp | P4-Comp | P2-Str | 95 | 99.251% | -15 | 1.241% |
| Temp2 | 4 | P2-Comp | P2-Comp | P3-Str | 320 | 99.898% | 210 | 1.888% |
| Temp2 | 5 | P2-Comp | P4-Comp | P3-Str | 210 | 99.875% | 100 | 1.865% |
| Temp2 | 6 | P4-Comp | P4-Comp | P3-Str | 100 | 99.650% | -10 | 1.640% | tions in the computer resource providing service, and the calculated performance indicator value.

7 Claims, 20 Drawing Sheets

(51) Int. Cl.
  *G06F 9/50* (2006.01)
  *H04L 29/08* (2006.01)
(58) Field of Classification Search
  USPC .......................................... 709/224, 225, 226
  See application file for complete search history.

(56) References Cited

U.S. PATENT DOCUMENTS

| | | | | |
|---|---|---|---|---|
| 2002/0116251 | A1* | 8/2002 | Chen | G06Q 30/0283 705/400 |
| 2011/0131335 | A1* | 6/2011 | Spaltro | G06F 9/5072 709/228 |
| 2011/0138047 | A1* | 6/2011 | Brown | G06Q 10/10 709/226 |
| 2012/0022944 | A1* | 1/2012 | Volpi | G06Q 30/00 705/14.53 |
| 2012/0072318 | A1 | 3/2012 | Akiyama et al. | |
| 2012/0117320 | A1* | 5/2012 | Pinchover | G06F 3/0611 711/112 |
| 2012/0131161 | A1* | 5/2012 | Ferris | G06Q 30/02 709/223 |
| 2012/0131594 | A1* | 5/2012 | Morgan | G06F 9/5072 718/105 |
| 2013/0067090 | A1* | 3/2013 | Batrouni | H04L 67/1097 709/226 |
| 2014/0068075 | A1* | 3/2014 | Bonilla | H04L 41/0823 709/226 |
| 2014/0200947 | A1* | 7/2014 | Gujar | G06Q 30/0631 705/7.26 |

OTHER PUBLICATIONS

Alexandru-Florian Antonescu et al. "Dynamic Topology Orchestration for Distributed Cloud-Based Applications", Proceedings of 2012 IEEE $2^{nd}$ Symposium on Network Cloud Computing and Applications (NCCA), 2012, 8 pages.

* cited by examiner

| PROVIDER | OFFERING NAME (FUNCTION NAME) | CATEGORY | PROVIDING RESOURCE CONDITION Compute: arch, CPUs, Mem, OS Storage: arch | PRICE | AVAILABILITY |
|---|---|---|---|---|---|
| Cloud P1 | P1-Comp | Compute | X86_64, 1, 4G, Linux | $100 / VM | 99% / VM |
| Cloud P1 | P1-Str | Storage | HDD | $10 / 100GB | 99% |
| Cloud P2 | P2-Comp | Compute | X86_64, 2, 4G, Linux | $150 / VM | 99.5% / VM |
| Cloud P2 | P2-Str | Storage | HDD | $15 / 100GB | 99.5% |
| Cloud P3 | P3-Comp | Compute | X_86, 3, 8G, Windows | $50 / VM | 99.9% / VM |
| Cloud P3 | P3-Str | Storage | HDD | $20 / 100GB | 99.9% |
| Cloud P4 | P4-Comp | Compute | X_86, 1, 4G, Linux | $40 / VM | 95% / VM |
| Cloud P4 | P4-Str | Storage | SSD | $50 / 100GB | 99.99% |

FIG.7

| TEMPLATE ID | APPLIED PLANS | FUNCTION C: compute S: storage | USABLE OFFERING |
|---|---|---|---|
| Temp0 (ORIGINAL) | - | C x1, S x1 | P1-Comp, P1-Str |
| Temp1 | Plan1 x1 | C x2, S x2 | P2-Comp, P4-Comp, P2-Str, P3-Str |
| Temp2 | Plan2 x1 | C x2, S x1 | P2-Comp, P4-Comp, P2-Str, P3-Str |
| Temp3 | Plan1 x1, Plan2 x1 | C x3, S x2 | P2-Comp, P4-Comp, P2-Str, P3-Str |
| Temp4 | Plan1 x2, Plan2 x1 | C x4, S x3 | P2-Comp, P4-Comp, P2-Str, P3-Str |
| Temp5 | Plan1 x1, Plan2 x2 | C x4, S x2 | P2-Comp, P4-Comp, P2-Str, P3-Str |
| Temp6 | Plan1 x2, Plan2 x2 | C x5, S x3 | P2-Comp, P4-Comp, P2-Str, P3-Str |
| ⋮ | ⋮ | ⋮ | ⋮ |

FIG.12

| TEMPLATE ID | NUMBER OF RESOURCE COMBINATION | USED OFFERINGS | | | | COST | AVAILABILITY INDICATOR VALUE | DIFFERENCE OF COSTS | DIFFERENCE OF AVAILABILITY INDICATOR VALUES |
|---|---|---|---|---|---|---|---|---|---|
| | | C1 | S1 | C2 | S2 | | | | |
| Temp1 | 1 | P2-Comp | P2-Str | P2-Comp | P2-Str | 330 | 99.990% | 220 | 1.980% |
| Temp1 | 2 | P4-Comp | P3-Str | P4-Comp | P3-Str | 120 | 99.740% | 10 | 1.730% |
| Temp1 | 3 | P2-Comp | P2-Str | P4-Comp | P3-Str | 225 | 99.949% | 115 | 1.939% |
| Temp1 | 4 | P2-Comp | P3-Str | P4-Comp | P2-Str | 225 | 99.967% | 115 | 1.957% |
| Temp1 | 5 | P2-Comp | P2-Str | P2-Comp | P3-Str | 335 | 99.994% | 225 | 1.984% |
| Temp1 | 6 | P4-Comp | P2-Str | P4-Comp | P3-Str | 115 | 99.721% | 5 | 1.711% |
| Temp1 | 7 | P2-Comp | P2-Str | P4-Comp | P2-Str | 220 | 99.994% | 110 | 1.984% |
| Temp1 | 8 | P2-Comp | P3-Str | P4-Comp | P3-Str | 230 | 99.969% | 120 | 1.959% |
| Temp1 | 9 | P2-Comp | P3-Str | P2-Comp | P3-Str | 340 | 99.996% | 230 | 1.986% |
| Temp1 | 10 | P4-Comp | P2-Str | P4-Comp | P2-Str | 110 | 99.700% | 0 | 1.690% |

FIG.13

| TEMPLATE ID | NUMBER OF RESOURCE COMBINATION | USED OFFERINGS | | | COST | AVAILABILITY INDICATOR VALUE | DIFFERENCE OF COSTS | DIFFERENCE OF AVAILABILITY INDICATOR VALUES |
| --- | --- | --- | --- | --- | --- | --- | --- | --- |
| | | C1 | C2 | S1 | | | | |
| Temp2 | 1 | P2-Comp | P2-Comp | P2-Str | 315 | 99.498% | 205 | 1.488% |
| Temp2 | 2 | P2-Comp | P4-Comp | P2-Str | 205 | 99.875% | 95 | 1.865% |
| Temp2 | 3 | P4-Comp | P4-Comp | P2-Str | 95 | 99.251% | -15 | 1.241% |
| Temp2 | 4 | P2-Comp | P2-Comp | P3-Str | 320 | 99.898% | 210 | 1.888% |
| Temp2 | 5 | P2-Comp | P4-Comp | P3-Str | 210 | 99.875% | 100 | 1.865% |
| Temp2 | 6 | P4-Comp | P4-Comp | P3-Str | 100 | 99.650% | -10 | 1.640% |

FIG.14

METHOD AND APPARATUS FOR PROVIDING INFORMATION FOR SELECTING CLOUDS

CROSS-REFERENCE TO RELATED APPLICATIONS

This application is based upon and claims the benefit of priority of the prior Japanese Patent Application No. 2014-041246, filed on Mar. 4, 2014, the entire contents of which are incorporated herein by reference.

FIELD

This invention relates to a technique for providing information to select clouds.

BACKGROUND

Conventionally, desired services and functions are realized in one cloud service, however, recently, it is focused on to realize services and functions by combining plural cloud services. In such a case, system construction and operational management are performed across plural clouds.

Moreover, as standard specifications for PaaS (Platform as a Service) that realizes portability and interoperability of application execution environments, TOSCA (Topology and Orchestration Specification for Cloud Applications) is announced from OASIS (Organization for the Advancement of Structured Information Standards). According to TOSCA, it becomes possible to describe application configuration deployed on the clouds and operation flows, and deploy and operate services having the same configuration on various clouds. As schematically depicted in FIG. 1, when a template to provide a service relating to Application A1 on a computing function (Compute) and storage function (Storage) is created, it becomes possible to instantiate (i.e. deploy) the service even on a cloud of a cloud provider P1, on a cloud of a cloud provider P2, or on a private cloud, which provide the computing function and storage function.

In view of the functions and/or services to be realized, when the aforementioned template is prepared, a cloud on which the service can be instantiated is identified. However, in order to actually operate the system, it is considered not only that the functions and/or services can be realized, but also a non-functional viewpoint such as costs and/or availability. However, it is not easy to select, from plural clouds that provide various functions and/or services, clouds that are preferable not only in a viewpoint that desired functions and/or services can be realized, but also in the non-functional viewpoint.

Patent Document 1: Japanese Laid-open Patent Publication No. 2006-99417

Patent Document 2: International Publication Pamphlet No. WO 2010/137455

In other words, conventional arts cannot provide information to select clouds to be used to realize functions to be used in the non-functional viewpoint.

SUMMARY

An information providing method relating to this invention includes: (A) obtaining a template that defines one or more functions to be used; (B) extracting plural combinations that are used to implement the one or more functions, which are defined in the obtained template, from a data storage unit that stores, for each of computer resource providing services that provide one or plural functions, a performance indicator value for each of the one or plural functions, wherein each of the plural combinations includes a computer resource providing service and one or more functions in the computer resource providing service; (C) calculating, for each of the extracted plural combinations, a performance indicator value for the combination based on data in the data storage unit; and (D) outputting, for at least one of the extracted plural combinations, the computer resource providing service, the one or more functions in the computer resource providing service, and the calculated performance indicator value.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a diagram depicting an example of data stored in an offering data storage unit;

FIG. 12 is a diagram depicting a relationship between the derived template and a usable offering;

FIG. 13 is a diagram depicting an example of a resource combination for derived template Temp1;

FIG. 14 is a diagram depicting an example of a resource combination for derived template Temp2;

DESCRIPTION OF EMBODIMENTS

Figure 1:
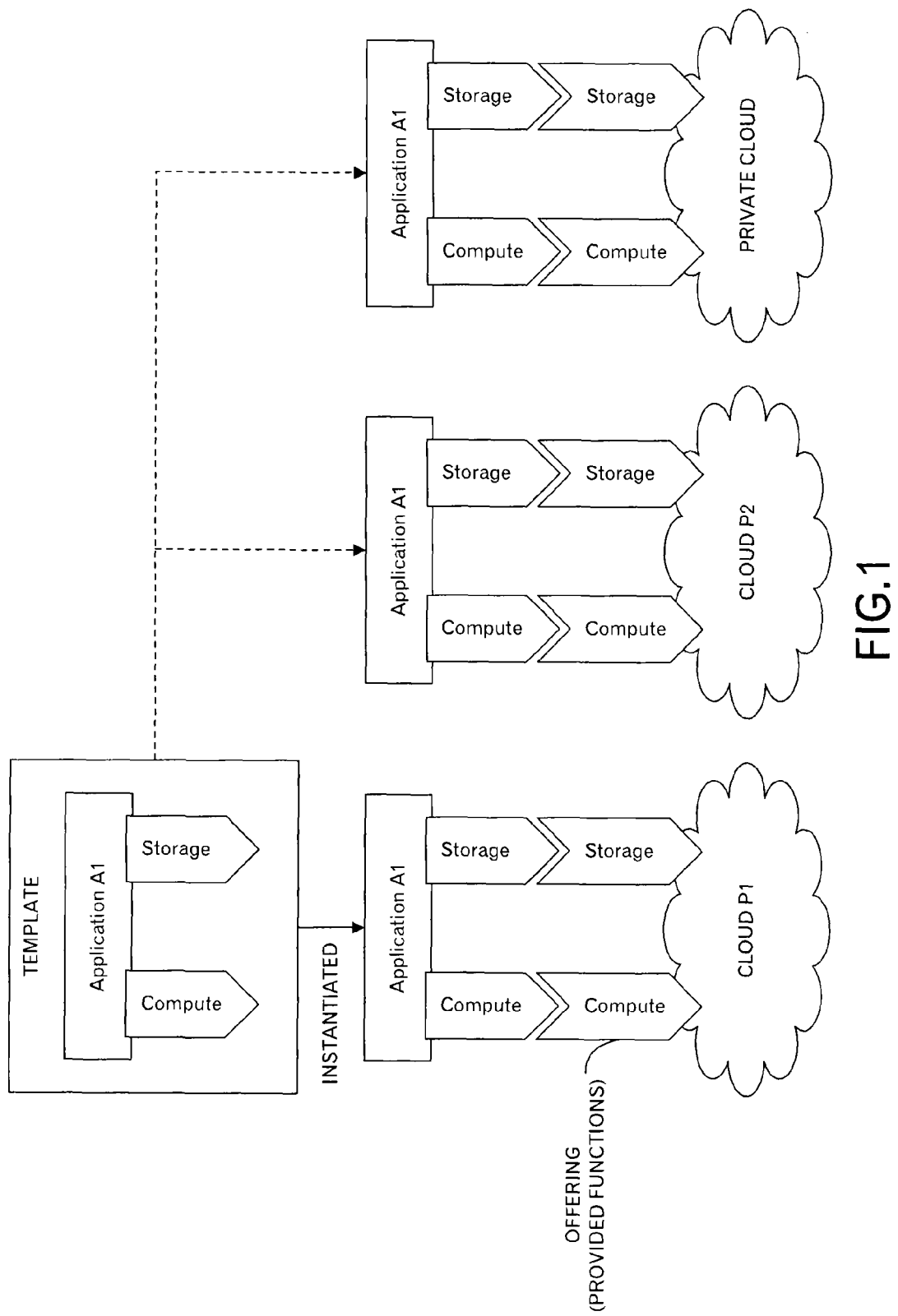
FIG. 1 is a diagram depicting an example of applying a template to clouds.
Figure 2:
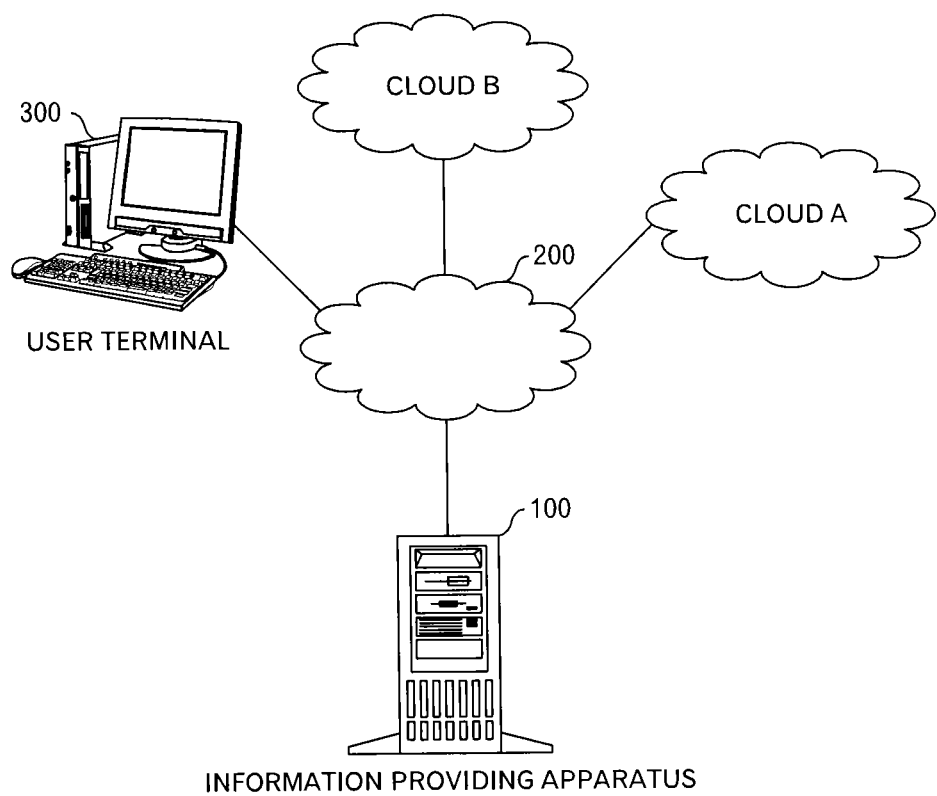
FIG. 2 is a diagram depicting an example of a system relating to this embodiment.

FIG. 2 illustrates an outline of a system relating to this embodiment of the present invention. An information providing apparatus 100 that performs a main processing relating to this embodiment is connected to a network 200 such as the Internet. Plural user terminals 300 that users who use clouds operate are connected to the network 200, and furthermore, plural clouds (clouds A and B in FIG. 2) that are services to provide computing resources for users or are systems for those services are also connected.

Figure 3:
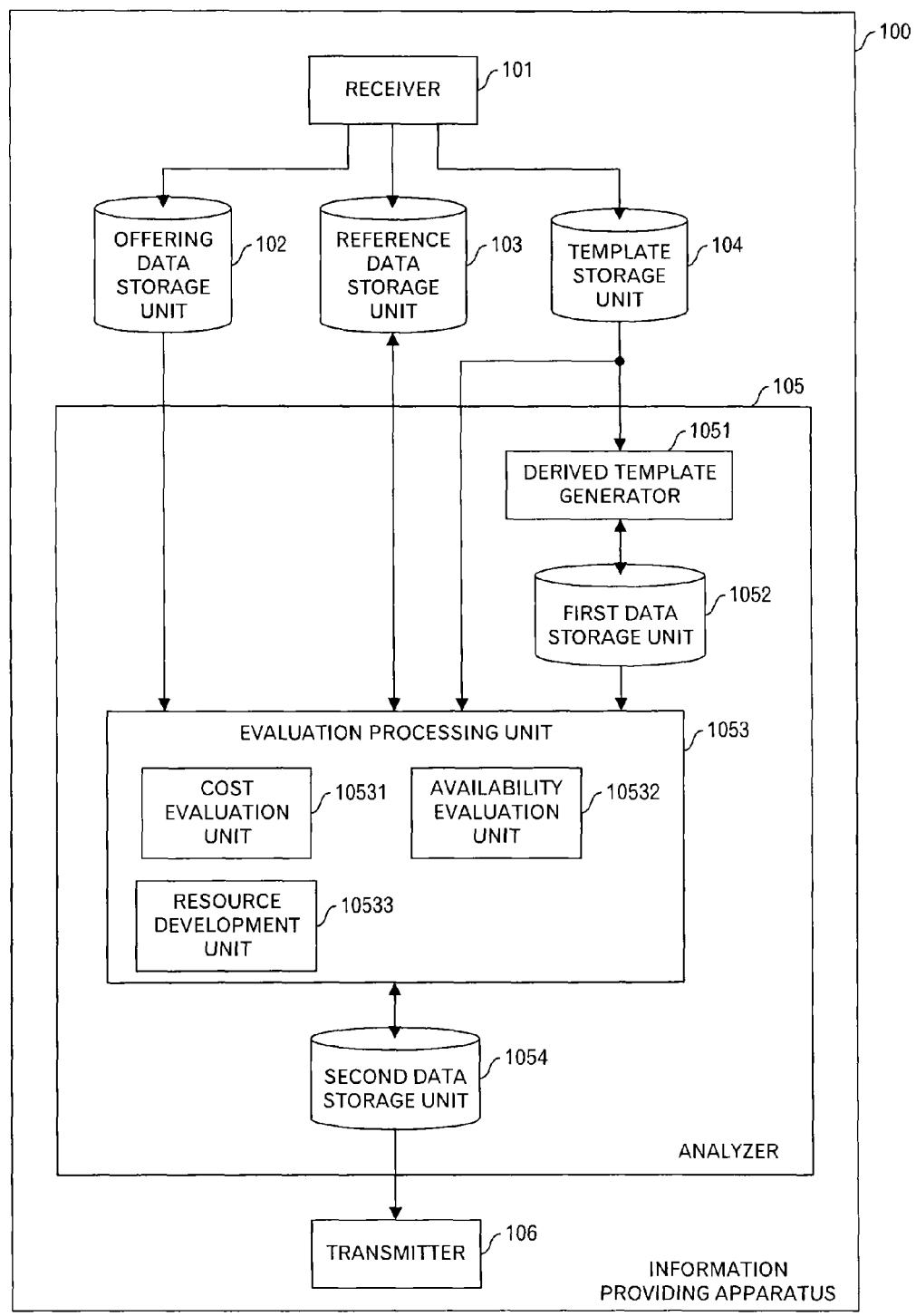
FIG. 3 is a functional block diagram of an information providing apparatus relating to this embodiment.

FIG. 3 illustrates a functional block diagram of the information providing apparatus 100. The information providing apparatus 100 relating to this embodiment has a receiver 101, an offering data storage unit 102, a reference data storage unit 103, a template storage unit 104, an analyzer 105 and a transmitter 106. The analyzer 105 has a derived template generator 1051, a first data storage unit 1052, an evaluation processing unit 1053 and a second data storage unit 1054. The evaluation processing unit 1053 has a cost evaluation unit 10531, an availability evaluation unit 10532 and a resource development unit 10533.

Figure 4:
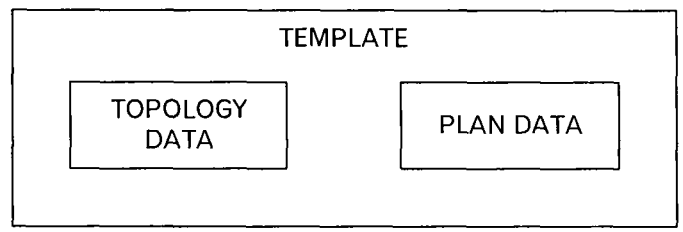
FIG. 4 is a diagram depicting a data example of a template relating to this embodiment.

When the receiver 101 receives an evaluation request from the user terminal 300, the receiver 101 stores data of a template included in the evaluation request in the template storage unit 104. The template is a template or the like, which is defined in TOSCA of OASIS, for example, and as schematically illustrated in FIG. 4, the template includes topology data that describes components deployed on a cloud and its resource definition, and plan data that includes definitions of a method for deploying functions and/or services, an operation procedure executable for a system to which the functions and/or services are deployed and its results.

Figure 5:
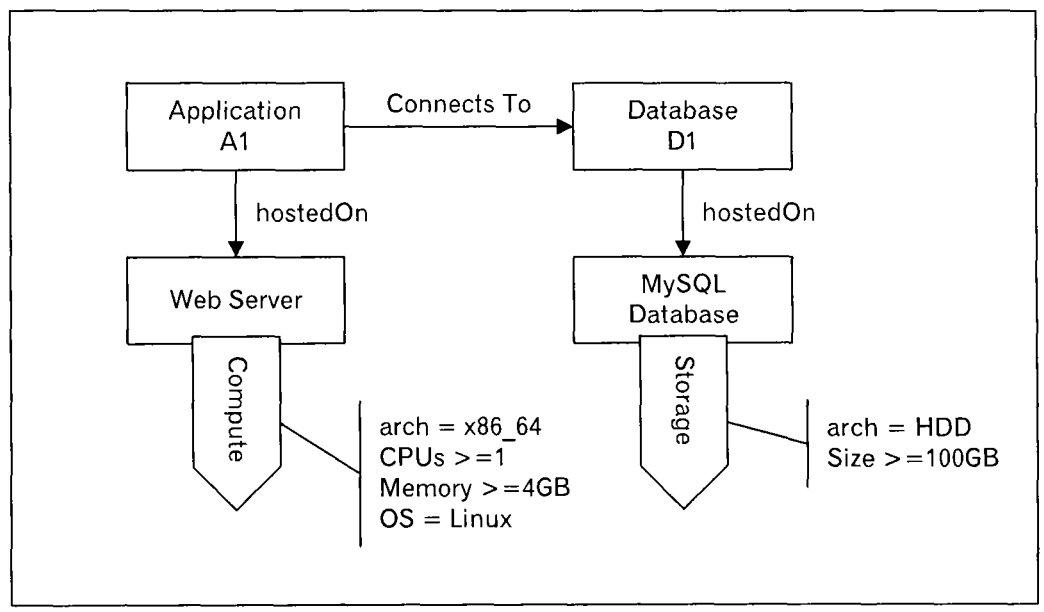
FIG. 5 is a diagram depicting an example of topology data.

FIG. 5 illustrates an example of topology data. In an example of FIG. 5, the topology of a system that a Web server is realized on a computing function, an Application A1 is executed, a database is realized on a storage function, an application of a Database D1 is executed, and the Application A1 is connected to the Database D1 is defined. As for the computing function and storage function, resource conditions that are requested by the user (also called "resource requirement definition") are also described, respectively. As for the computing function, the architecture (arch), the number of CPUs (Central Processing Units), a memory amount and a type of OS (Operating System) are defined. As for the storage function, the architecture (arch) and the capacity (or size) are defined. Thus, components of the system to be constructed on the clouds are arbitrarily defined.

Figure 6:
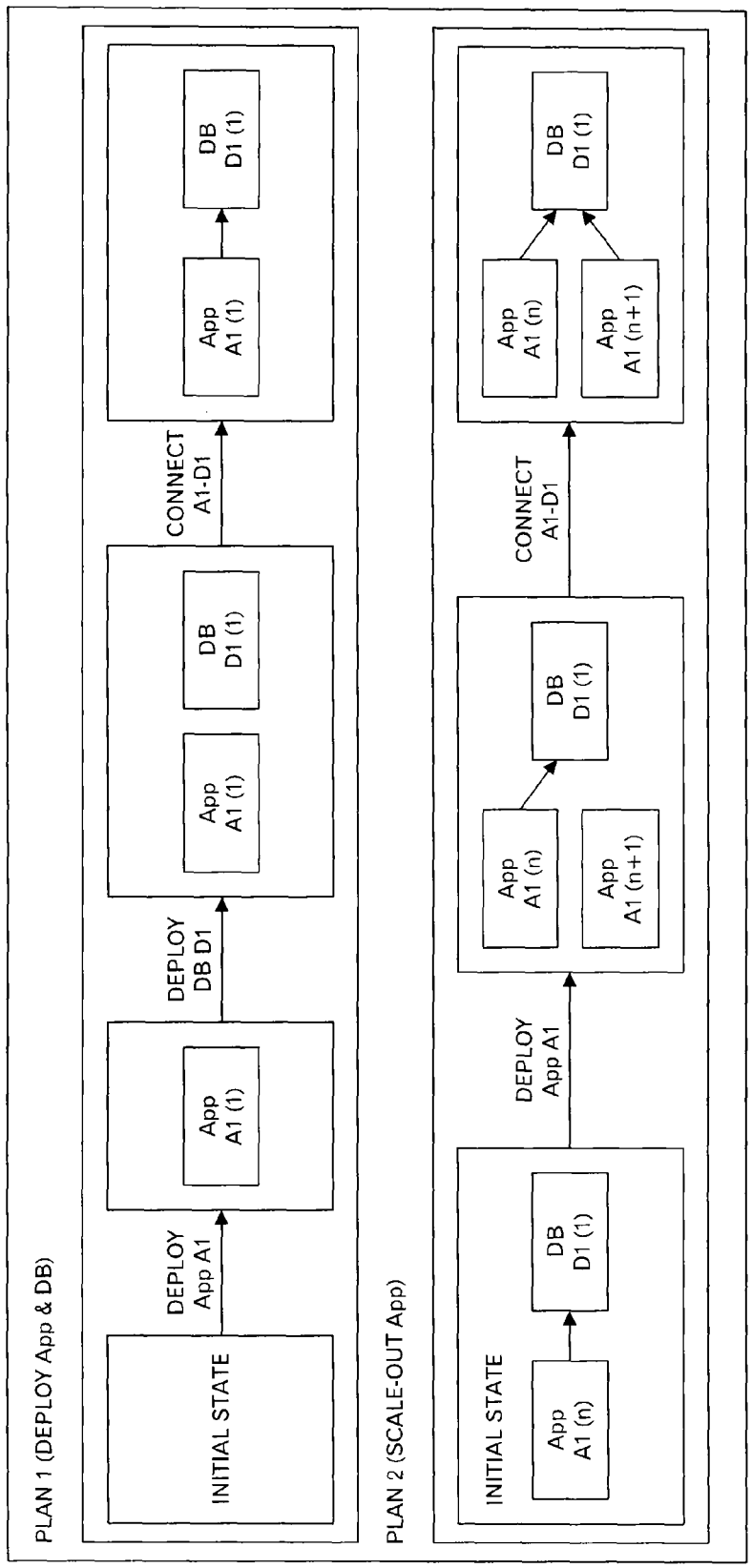
FIG. 6 is a diagram depicting an example of plan data.

FIG. 6 illustrates an example of plan data. In an example of FIG. 6, plan 1 to define a method for deploying functions and/or services, and plan 2 to execute scale-out of the application as an operation procedure executable for the system on which the functions and/or services are provided are included. The plan 1 represents a deployment method for deploying a system having a basic configuration, and describes that a procedure is executed that the Application A1 is deployed from an initial state, the Database D1 is deployed, and after that, the Application A1 is connected to the Database D1. On the other hand, the plan 2 represents a method for scaling out the Application A1, and describes that a procedure is executed that a new Application A1 is additionally deployed after the deployment of the system, and the new Application A1 is connected to the Database D1, which has already been deployed. The deployment method for deploying the system having the basic configuration like the plan 1 has to be defined, however, the procedure of the scale-out like the plan 2 is an arbitrary plan defined according to a user's policy. The number of plans is also arbitrary.

Moreover, the receiver 101 receives reference data from the user terminal 300, and stores the received reference data in the reference data storage unit 103. The reference data may simply be reference values for a cost and an availability indicator value, or may be designation data of a cloud when the cloud has already been used.

Furthermore, when offering data is received from a certain apparatus of each cloud or an administrator terminal of the information providing apparatus 100, the receiver 101 stores the offering data in the offering data storage unit 102. The offering data includes functions provided by the cloud (which include resource conditions), a price and an availability indicator value.

Specifically, data as illustrated in FIG. 7 is stored in the offering data storage unit 102. In an example of FIG. 7, a provider name of the cloud, an offering name (function name), a category (calculation function or storage function), a providing resource condition, a price and an availability indicator value are registered. For example, as for the function "Cloud P1" of the cloud "P1-Comp", the computing function (Compute), the architecture "X8664", the number of CPUs "1", the memory capacity "4G", the OS type "Linux (registered trademark)", the price "$100/VM" and the availability indicator value "99%/VM" are defined for each VM (Virtual Machine). Moreover, as for the function "P1-Str" of the cloud "Cloud P1", the storage function (Storage), the architecture "HDD", the price "$10/100 GB" and the availability indicator value "99%" are defined. The price is described by the cost per one VM, the cost per a unit time for the CPU usage time, the cost per one unit capacity or the like. Moreover, the availability indicator value is a ratio of the time while the resources for which the cloud user contracts with the cloud provider can be normally utilized (i.e. operating rate), and is calculated by an expression, for example, as follows:

(1 year−(total time while the resource cannot be used by a failure, for example))/1 year The derived template generator 1051 of the analyzer 105 generates data of a derived template by applying plan data to topology data (which is called "an original topology") included in a template (which is called "an original template"), which is stored in the template storage unit 104 one or plural times, and stores the generated data in the first data storage unit 1052. For example, in case of considering an example of the plan data in FIG. 6, when the plan 1 is applied once to the original topology included in the original template, two basic configurations of the original topology are independently deployed. On the other hand, when the plan 2 is applied once to the original topology, the application Pd is parallelized. Variations such as derived templates generated by applying the plan 1 plural times, applying the plan 2 plural times, and applying the plan 1 and the plan 2 plural times are generated until a predetermined number of derived templates are generated.

The resource development unit 10533 of the evaluation processing unit 1053 extracts, for each of the derived templates stored in the first data storage unit 1052, a combination of clouds that can implement functions defined in the derived template (such a combination may be called "a resource combination"), and stores the extracted data in the second data storage unit 1054.

The cost evaluation unit 10531 of the evaluation processing unit 1053 calculates, for each resource combination of each derived template, a cost that is required when the system defined in the derived template is implemented, based on the data stored in the offering data storage unit 102, and stores the calculated cost in the second data storage unit 1054. When designation data of the cloud is stored in the reference data storage unit 103, the cost evaluation unit 10531 calculates a cost that is required when the functions defined in the original topology are implemented on the designated cloud, and stores the calculated cost in the reference data storage unit 103.

The availability evaluation unit 10532 of the evaluation processing unit 1053 calculates, for each resource combination of each derived template, an availability indicator value in case where the system defined in the derived template is implemented, based on the data stored in the offering data storage unit 102, and stores the calculated availability indicator value in the second data storage unit 1054. Moreover, when the designation data of the cloud is stored in the reference data storage unit 103, the cost evaluation unit 10531 also calculates an availability indicator value in case where the functions defined in the original topology are implemented on the designated cloud, and stores the calculated availability indicator value in the reference data storage unit 103.

The evaluation processing unit 1053 compares the costs and availability indicator values, which are respectively calculated for the resource combinations of the respective derived templates, with the reference value of the cost and the reference value of the availability indicator value. Then, the evaluation processing unit 1053 identifies a resource combination for the derived template, whose cost is equal to or less than the reference value of the cost and whose availability indicator value are equal to or greater than the reference value of the availability indicator value, and stores data of the identified resource combination in the second data storage unit 1054.

The transmitter 106 transmits an evaluation result stored in the second data storage unit 1054 to the user terminal 300 of the evaluation request source.

Next, processing contents of the information providing apparatus 100 will be explained by using FIGS. 8 to 20.

Figure 8:
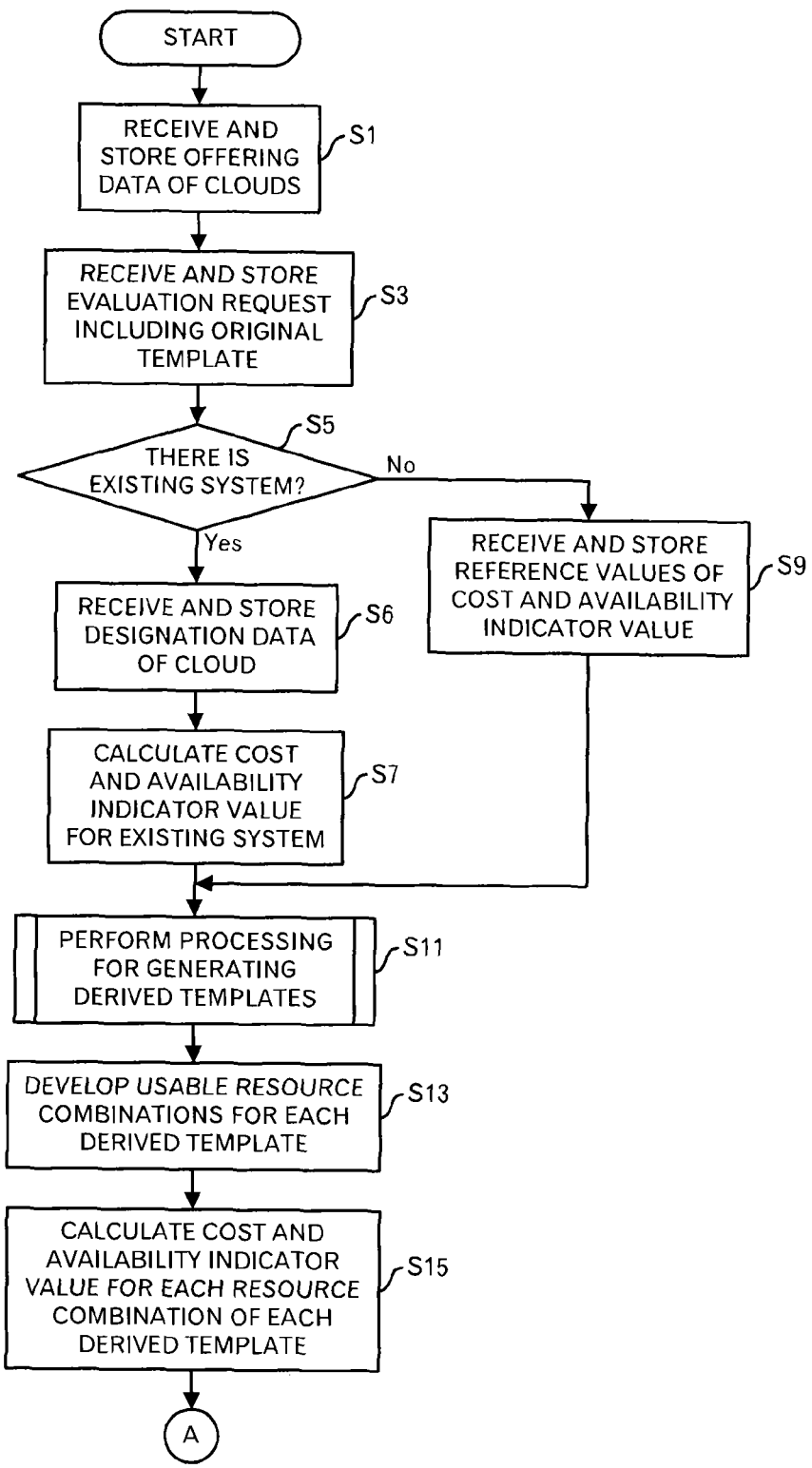
FIG. 8 is a diagram depicting a processing flow relating to this embodiment.

Firstly, the receiver 101 receives offering data of clouds to be introduced to the user from the information providing apparatus 100, from an administrator terminal or the like of the information providing apparatus 100, for example, and stores the received data in the offering data storage unit 102 (FIG. 8: step S1).

Moreover, the receiver 101 receives an evaluation request including data of the original template from the user terminal 300, and stores the received data of the original template in the template storage unit 104 (step S3). For example, it is assumed that data of the original topology as illustrated in FIG. 5 and plan data as illustrated in FIG. 6 are received.

Moreover, when there is no existing system (step S5: No route), the receiver 101 receives the reference values of the cost and the availability indicator value from the user terminal 300, and stores the received data in the reference data storage unit 103 (step S9). Then, the processing shifts to step S11. For example, a cost for a computing function defined in the original template (e.g. cost per one VM), a cost for a storage function defined in the original template (e.g. cost per one unit capacity), an availability indicator value (%) for the computing function and an availability indicator value (%) for the storage function are designated as reference values.

On the other hand, when there is an existing system (step S5: Yes route), the receiver 101 receives the designation data of the cloud, and stores the received data in the reference data storage unit 103 (step S6). For example, it is assumed that the computing function and storage function for the cloud "Cloud P1" have already been used.

Then, the cost evaluation unit 10531 and availability evaluation unit 10532 of the evaluation processing unit 1053 calculate the cost and availability indicator value for the existing system, and store the calculated cost and availability indicator value in the second data storage unit 1054 (step S7).

Figure 9:
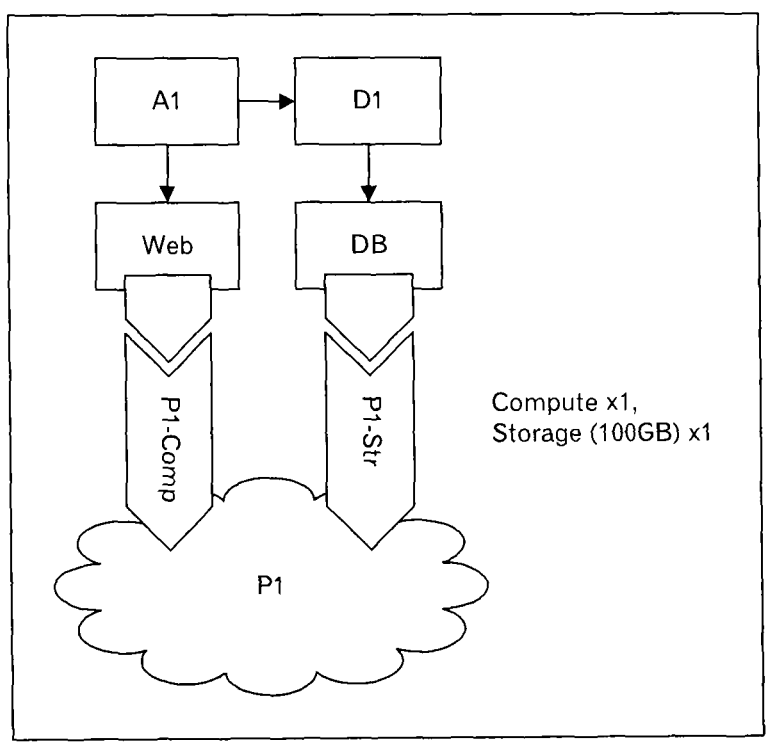
FIG. 9 is a diagram to explain calculation of a cost and an availability indicator value of an existing system.

For example, a situation as illustrated in FIG. 9 is assumed. As described above, because one computing function (VM) of the cloud "Cloud P1" and the storage function including 100 G of the cloud "Cloud P1" are used, $110 (=$100+$10) is calculated as the cost according to FIG. 7. On the other hand, the availability indicator value of the computing function is 99% and the availability indicator value of the storage function is 99%. In this embodiment, in order to simplify the calculation, one availability indicator value is calculated focusing on that the entire service realized by the original template is available. Therefore, because, as illustrated in FIG. 9, one computing function and one storage function are used, 0.9801 (=0.99*0.99) is calculated as the availability indicator value of the entire service. It is assumed that, when at least one computing function is operable in case where the computing function is duplicated, it is determined that the entire service is available.

As for the cost, instead of the cost per one unit time, the total cost during the contract period may be used. Accordingly, a case where the cost is gradually decreased in case of the long-term contract and/or a case where the initial expense is high can be considered.

The availability indicator value may be calculated, for example, for each of the computing function and the storage function, or may be calculated for each cloud or each data center. Namely, in case of the implementation in the same cloud or data center, that operating ratio may be employed or when plural clouds or data centers are used, a product of those operating ratios may be employed.

Furthermore, as for the cost and availability indicator value, other simulation methods may be used to predict them.

After that, the derived template generator 1051 performs a processing to generate derived templates from the original templates stored in the template storage unit 104, and stores data of the generated derived templates in the first data storage unit 1052 (step S11). The processing to generate the derived templates will be explained by using FIG. 10.

Figure 10:
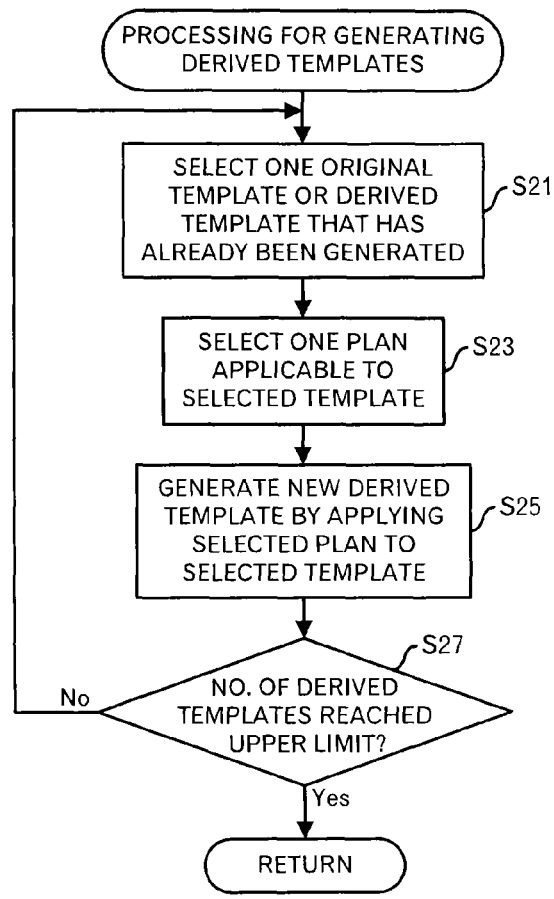
FIG. 10 is a diagram depicting a processing flow of a processing to generate a derived template.

The derived template generator 1051 selects the original template or one derived template that has been generated (FIG. 10: step S21). Initially, because there is no derived template that has been generated, the original template is selected. Moreover, it is not efficient to generate the same derived template several times, therefore, selecting one template is performed the number of times that is the same as the number of plans, for example.

Moreover, the derived template generator 1051 selects one plan that is applicable to the selected template (step S23). Because applying the same plan to the same template is not efficient, it is assumed that the applicable plan is a plan that has not been applied to the selected template.

After that, the derived template generator 1051 generates a new derived template by applying the selected plan to the selected template, and stores data of the new derived template in the first data storage unit 1052 (step S25). There is a case where the same derived template is generated by applying the plan, therefore, when the same derived template is generated, that derived template is not stored in the first data storage unit 1052 in this embodiment.

Then, the derived template generator 1051 determines whether or not the number of derived templates reached the predetermined upper limit value (step S27). When the number of derived templates does not reach the upper limit, the processing returns to the step S21. On the other hand, when the number of derived templates reached the upper limit value, the processing returns to a calling-source processing.

By using the original template as illustrated in FIGS. 5 and 6 as an example, the generation of the derived templates will be explained by using FIGS. 11A to 11G.

Figure 11A:
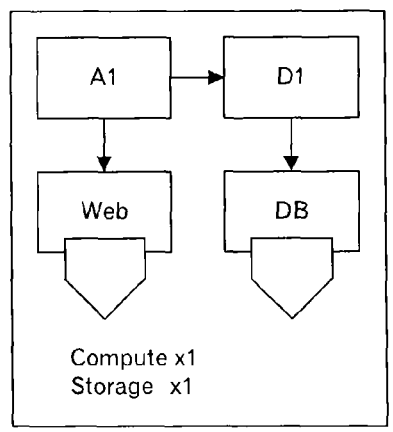
FIG. 11A is a diagram depicting an example of an original template.
Figure 11B:
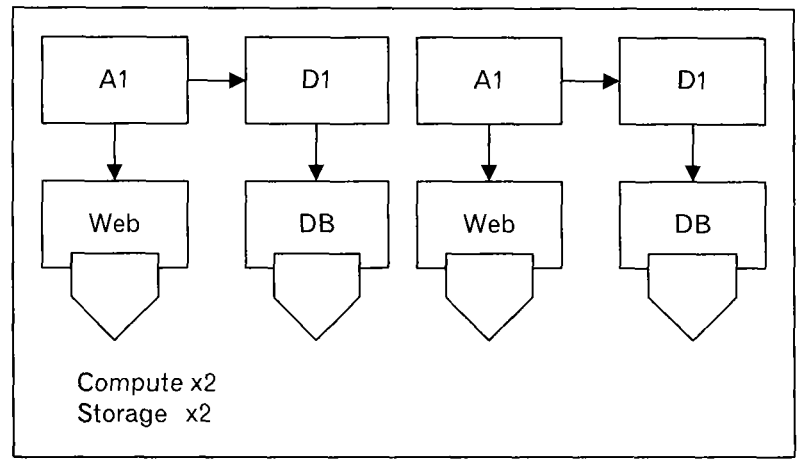
FIG. 11B is a diagram depicting an example that plan 1 is applied to the original template.
Figure 11C:
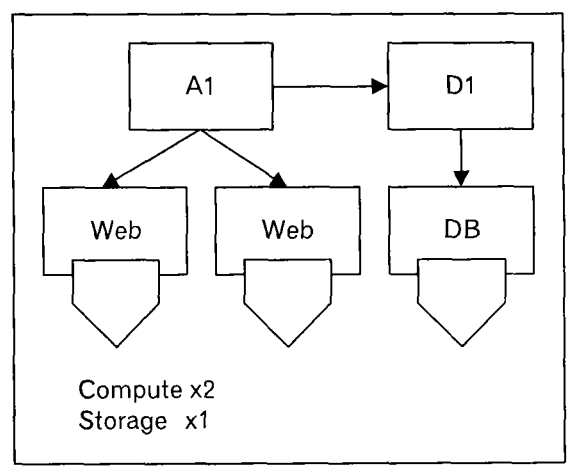
FIG. 11C is a diagram depicting an example that plan 2 is applied to the original template.

FIG. 11A illustrates the original topology of the original template. When the plan 1 in FIG. 6 is applied to the original topology, a state is obtained that two original topologies are implemented in parallel as illustrated in FIG. 11B. On the other hand, when the plan 2 in FIG. 6 is applied to the original topology, a state is obtained that the Application A1 is duplicated as illustrated in FIG. 11C.

Figure 11D:
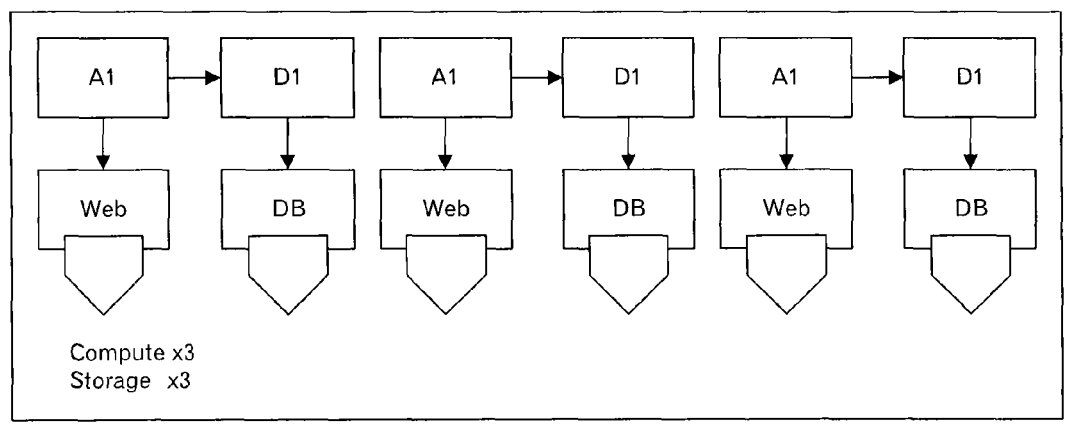
FIG. 11D is a diagram depicting an example that the plan 1 is applied to the original template twice.
Figure 11E:
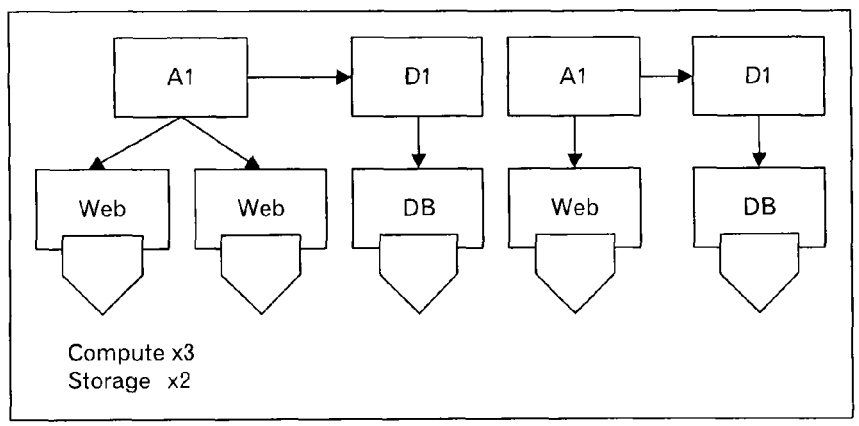
FIG. 11E is a diagram depicting an example that the plan 1 and plan 2 are applied to the original template.

Next, when the plan 1 in FIG. 6 is applied to the derived template illustrated in FIG. 11B (more specifically, the derived topology), a state is obtained that the three original topologies are implemented in parallel as illustrated in FIG. 11D. Furthermore, when the plan 2 in FIG. 6 is applied to the derived template illustrated in FIG. 11B, a state is obtained that one topology in which the Application A1 is duplicated is provided in parallel in addition to one original topology, as illustrated in FIG. 11E. On the other hand, when the plan 1 in FIG. 6 is applied to the derived template illustrated in FIG. 11C, the same configuration as the derived template illustrated in FIG. 11E is obtained. Therefore, no derived template is added. Moreover, when the plan 2 in FIG. 6 is applied to the derived template illustrated in FIG. 11C, a state is obtained that the topology in which the Application A1 is triplicated and one original topology are provided in parallel as illustrated in FIG. 11F.

Figure 11F:
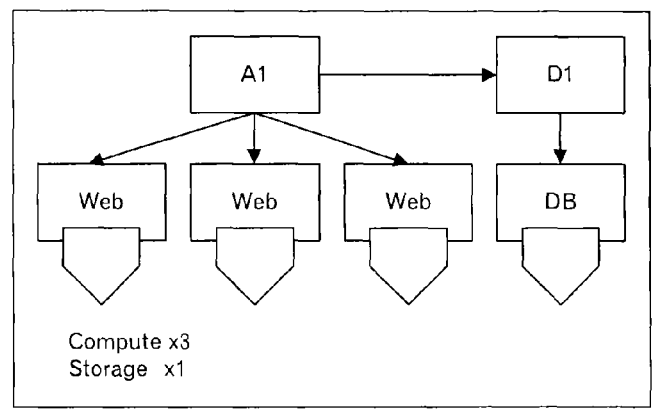
FIG. 11F is a diagram depicting an example that the plan 2 is applied to the original template twice.
Figure 11G:
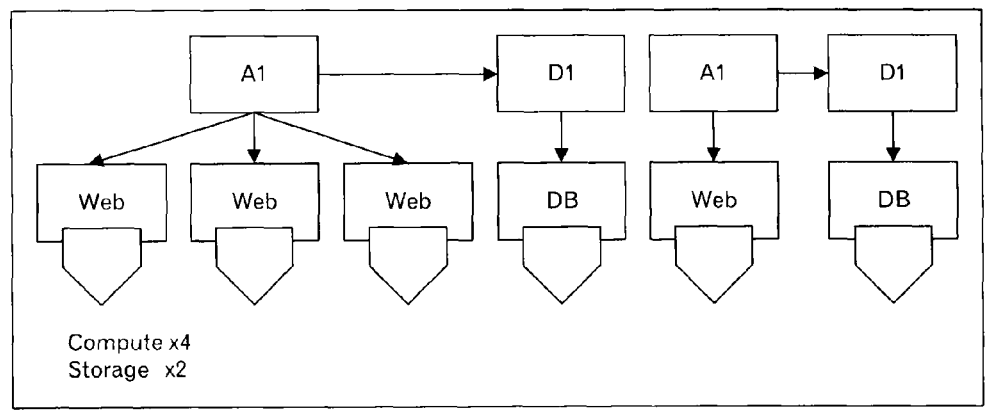
FIG. 11G is a diagram depicting an example that the plan 2 is applied twice and the plan 1 is applied once to the original template.

Moreover, when the plan 1 in FIG. 6 is applied to the derived template illustrated in FIG. 11F, a state is obtained that the Application A1 is triplicated as illustrated in FIG. 11G.

By repeating such a processing, the predetermined number of derived templates is generated, and data of the generated derived templates is stored in the first data storage unit 1052. The original template may be stored in the first data storage unit 1052 in order to process the original template like the derived template.

Returning to the explanation of the processing in FIG. 8, the resource development unit 10533 of the evaluation processing unit 1053 develops, for each derived template, usable resource combinations, and stores the development results in the second data storage unit 1054 (step S13). This processing is performed in two steps.

At the first stage, for each function, a resource condition is extracted from the derived template, and clouds that match the extracted resource condition are extracted. In an example of FIG. 5, as for the computing function, clouds that satisfy the architecture "x86_64", one or more CPUs, 4G or more for the memory capacity and OS "Linux (registered trademark)" are extracted. Similarly, as for the storage function, clouds that satisfy the architecture "HDD" and 100 G or more for the capacity are extracted.

When there is a condition that there is an existing system and the cloud that has been used (e.g. Cloud P1) is not used, "P2-Comp" and "P4-Comp" are extracted as the computing function, and "P2-Str" and "P3-Str" are extracted as the storage function according to FIG. 7.

For example, data as illustrated in FIG. 12 is generated. In an example of FIG. 12, a template ID that is assigned in order of the generation, an applied plan which is used for the generation, the type and the number of functions used in this template, and usable offering that represents usable functions of clouds are included. Moreover, in FIG. 12, the original template is handled as Temp0.

When the cloud that has already been used is also used for this processing, "P1-Comp" and "P1-Str" are also extracted as the usable offering.

At the next stage, for each derived template, all combinations of functions in the clouds, which are extracted at the first stage, are generated for each function used in that derived template.

For example, it is assumed that the derived template Temp1 has the topology as illustrated in FIG. 11B, and the computing function of the first original topology is represented by C1, the storage function of the first original topology is represented by S1, the computing function of the second original topology is represented by C2 and the storage function of the second original topology is represented by S2. Then, as illustrated in FIG. 13, 10 types of resource combinations are developed for the derived template Temp1.

As described above, there exist two types of functions in the clouds usable for the computing function and two types of functions in the clouds usable for the storage function, therefore, there are total 16 types of resource combinations (=4 types*4 types). However, when 6 types of resource combinations that are substantially the same are excluded, total 10 types of resource combinations are obtained. For example, a case where "P2-Comp" is assigned to C1, "P4-Comp" is assigned to C2, "P2-Str" is assigned to S1 and "P3-Str" is assigned to S2 and a case where "P4-Comp" is assigned to C1, "P2-Comp" is assigned to C2, "P3-Str" is assigned to S1 and "P2-Str" is assigned to S2 are substantially the same. Therefore, either of them is excluded.

In FIG. 13, the cost and availability indicator value and differences with those of the original template are calculated in the following processing. Therefore, they are not calculated at this stage.

Moreover, the derived template Temp2 has the topology as illustrated in FIG. 11C, however, the first computing function of the duplicated computing functions is represented by C1, the second computing function is represented by C2 and the storage function is represented by S1. Then, as illustrated in FIG. 14, 6 types of resource combinations are developed for the derived template Temp2.

As described above, there are two types of functions in the clouds, which are usable for the computing functions, and there are two types of functions in the clouds, which are usable for the storage function. Therefore, there are total 8 types of resource combinations (=4 types*2 types). However, when two types of resource combinations that are substantially the same are excluded from them, total 6 types of resource combinations are obtained. For example, a case where "P2-Comp" is assigned to C1 and "P4-Comp" is assigned to C2 and a case where "P4-comp" is assigned to C1 and "P2-Comp" is assigned to C2 are substantially the same. Therefore, either of them is excluded.

As described above, there is a case where the cost and availability indicator value of the original template are improved by implementing functions on a cloud other than the cloud that has already been used. Therefore, the resource development may be performed for the original template. At this time, the resource combination in which completely the same implementation as that of the cloud that has already been used is excluded, and other resource combinations are employed as they are. Moreover, when there is no cloud that has already been used, the original template may be processed as one type of derived template.

Then, the cost evaluation unit 10531 and availability evaluation unit 10532 of the evaluation processing unit 1053 calculate the cost and availability indicator value for each resource combination of each derived template, and store the calculated values in the second data storage unit 1054 (step S15). After that, the processing shifts to a processing in FIG. 16 through terminal A.

Figure 15:
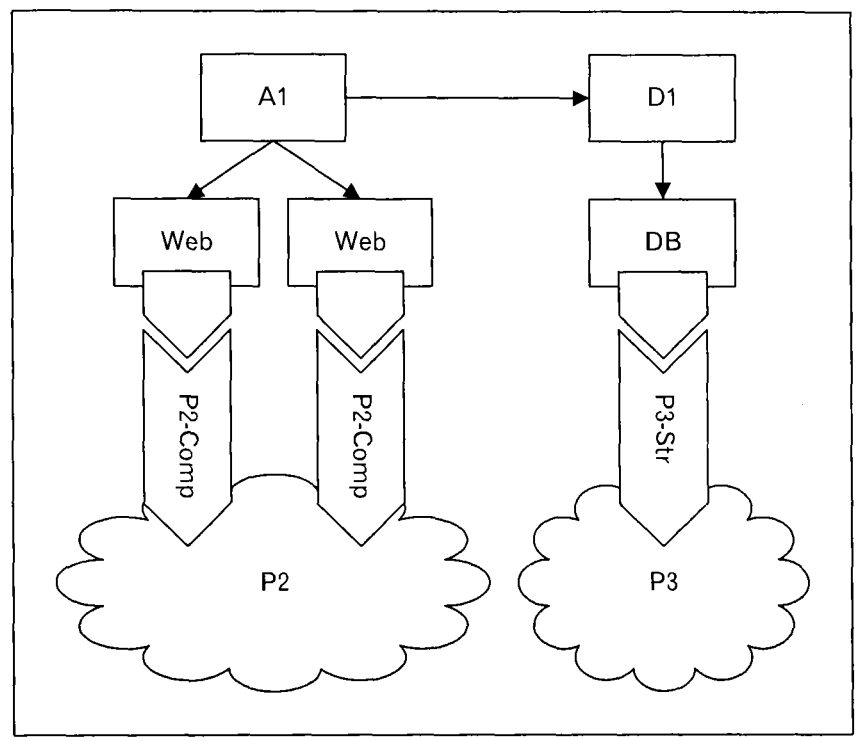
FIG. 15 is a diagram depicting a state in case where derived template Temp2 is implemented by a certain resource combination.

The processing contents of this step are basically similar to those explained for the step S7. For example, the derived template Temp2 in FIG. 14 is implemented by the fourth resource combination, a state as illustrated in FIG. 15 is obtained. According to FIG. 7, the availability indicator value of P2-Comp is 99.5%. Therefore, the probability that both of two computing functions do not operate is $(1-0.995)^2$. Therefore, the probability that at least either of them Operates and the service can be provided is 0.999975 $(=1-(1-0.995)^2)$. On the other hand, because the availability indicator value of P3-Str is 99.9%, the availability indicator value for the entire system is 0.9990 (0.999*0.999975). In addition, \$320 (=\$150*2+\$20) is calculated as the cost.

When such calculation is performed, costs and availability indicator values are calculated as illustrated in FIGS. 13 and 14. Furthermore, a difference with the reference value of the cost, which is stored in the reference data storage unit 103, and a difference with the reference value of the availability indicator value, which is stored in the reference data storage unit 103, are calculated. In FIGS. 13 and 14, when the difference for the cost is positive, it is represented that the cost increased. Moreover, when the difference for the same availability indicator value is positive, it is represented that the availability indicator value is improved.

In the example of FIG. 13, it is represented that, only for the resource combination in the last line, the cost is identical, and the availability indicator value is improved. In the example of FIG. 14, it is represented that the cost is reduced and the availability indicator value is improved for the resource combinations in the third line and the sixth line.

Figure 16:
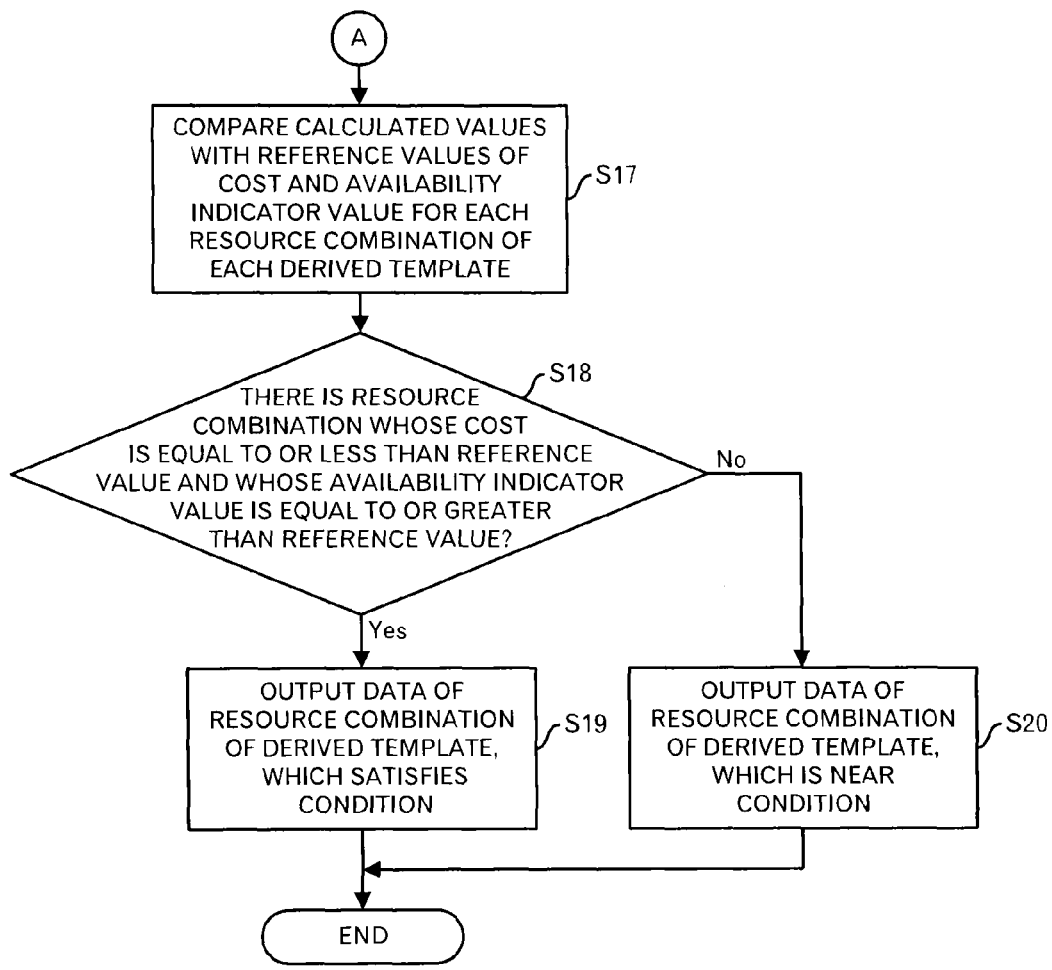
FIG. 16 is a diagram depicting a processing flow relating to this embodiment.

Shifting to the explanation of the processing in FIG. 16, the evaluation processing unit 1053 compares, for each resource combination of each derived template, the cost and availability indicator value of the resource combination with the corresponding reference values of the cost and availability indicator value (step S17). For example, as illustrated in FIGS. 13 and 14, the differences with the reference values may be calculated.

Then, the evaluation processing unit 1053 determines whether or not there is a resource combination of a derived template, whose cost is equal to or less than the corresponding reference value and whose availability indicator value is equal to or greater than the corresponding reference value (step S18).

When there is a resource combination of a derived template, which satisfies this condition (step S18: Yes route), the evaluation processing unit 1053 stores data to identify that resource combination of the derived template in the second data storage unit 1054 in correlation with the data of the derived template. Then, the transmitter 106 transmits data of the resource combination of the derived template, which satisfies the aforementioned condition and is stored in the second data storage unit 1054, to the user terminal 300 of the evaluation requesting source (step S19).

Figure 17:
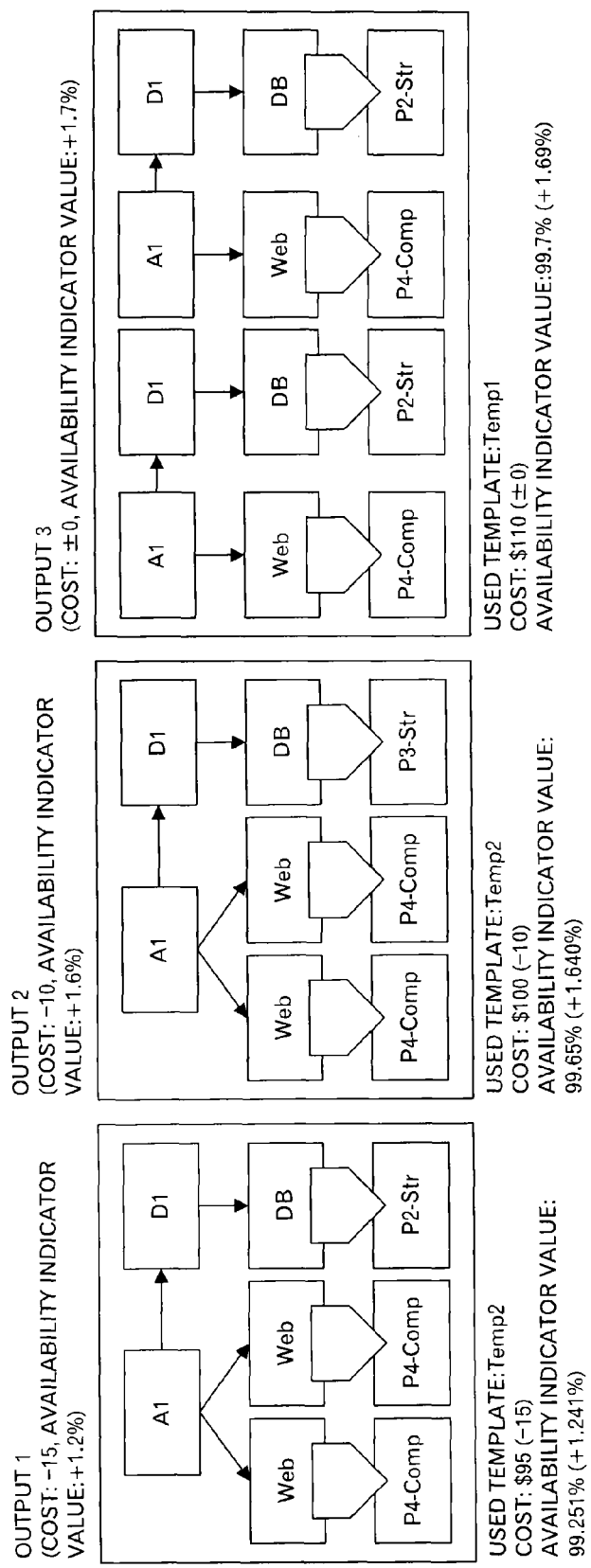
FIG. 17 is a diagram depicting an example of output data.

For example, when three resource combinations as illustrated in FIGS. 13 and 14 are the resource combinations of the derived templates, which satisfy the condition of the step S18, data as illustrated in FIG. 17 is generated and transmitted, for example. In the example of FIG. 17, a diagram representing the topology of the derived template, the cost and availability indicator value, and differences with those reference value are included. Data may be outputted in ascending order of the cost or in descending order of the availability indicator value.

On the other hand, when there is no resource combination of the derived template, which satisfies the condition at the step S18, the evaluation processing unit 1053 extracts a resource combination of a derived template, whose cost is the least or difference for the cost is equal to or less than a predetermined value and whose availability indicator value is equal to or greater than the reference value, as the resource combination of the derived template, which is near the condition, and stores data to identify that resource combination of the derived template in correlation with data of the derived template in the second data storage unit 1054. Then, the transmitter 106 transmits data of the resource combination of the derived template, which is near the condition, to the user terminal 300 of the evaluation request source (step S20). The contents of the output are similar to the example illustrated in FIG. 17.

There are various modes for the output method. For example, data of the topology may not be outputted, however, table as illustrated in FIGS. 13 and 14 may be outputted. Furthermore, the topology and resource combination of the derived template, which is selected by the user, may be outputted, separately. Moreover, the availability indicator value that can be reached in case of the cost that is the same as the reference value may be calculated from the viewpoint of the cost, or the cost to realize the availability indicator value that is the same as the reference value may be calculated from the viewpoint of the availability indicator value.

Accordingly, the user can identify much preferable topology and resource combination from a non-functional side such as the cost and availability indicator value.

Figure 18:
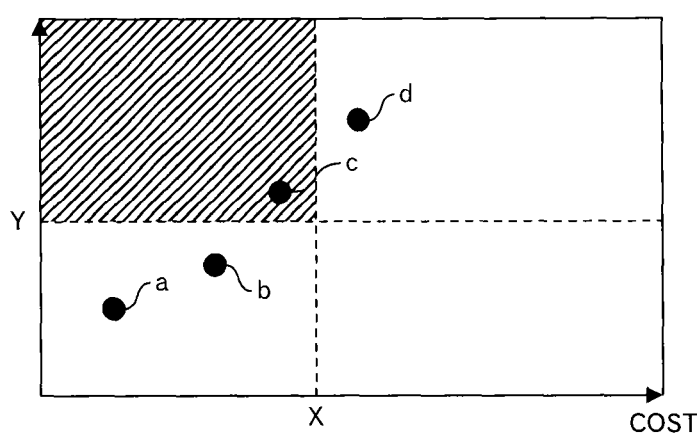
FIG. 18 is a diagram depicting an example of a plan mapped by the cost and the availability indicator value.

In the aforementioned processing, as illustrated in FIG. 18, points corresponding to the resource combinations of the derived templates are plotted on a plane mapped by the cost and the availability indicator value. In FIG. 18, only 4 points a to d are illustrated, however, plural resource combinations are actually correlated with one derived template. Therefore, more points are plotted.

Then, the comparison is performed on this plane with the reference value X of the cost and the reference value Y of the availability indicator value, which are directly set by the user, or the cost X and the availability indicator value Y for the existing system. In the example of FIG. 18, the point c on the upper left area, in which the availability indicator value is equal to or greater than Y and the cost is equal to or less than X, satisfies the condition of the cost and the availability indicator value, which are designated by the user.

Figure 19:
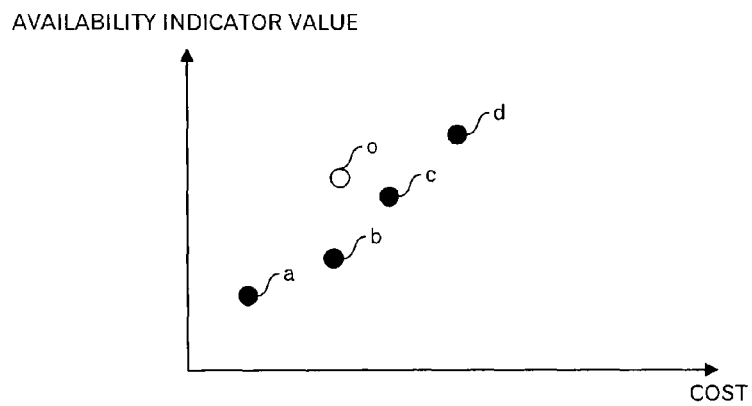
FIG. 19 is a diagram depicting an example of a plan mapped by the cost and the availability indicator value.

On the other hand, when there is an existing system, and the point o corresponding to those cost and availability indicator value is located at a position as illustrated in FIG. 19, there is no point that is located on the upper left of the point o. In such a case, the point d whose availability indicator value is equal to or greater than that of the point o and whose cost is the least may be presented for the user, or the point c whose distance with the point o on the plane is the shortest may be presented for the user.

In the aforementioned embodiment, the resource combinations are developed mainly for the derived templates, however, the resource combinations may be developed for the original template. In such a case, there is a possibility that the resource combination whose cost is lower than that of the existing system and whose availability indicator value becomes higher is found. In other words, when the points a to d illustrated in FIG. 18 correspond to results obtained by developing the resource combinations for the original template, the point c is detected as the resource combination that is much preferable than the existing system.

However, generally, the availability indicator value becomes high in case where the computing function is multiplicated. Therefore, even when the different resource combination is applied to the original template, only point o1 at which the cost is lowered but the availability indicator value is decreased or point o2 at which the availability indicator value increases but the cost increases may be found for the point o corresponding to the cost and availability indicator value of the existing system as illustrated in FIG. 20.

Figure 20:
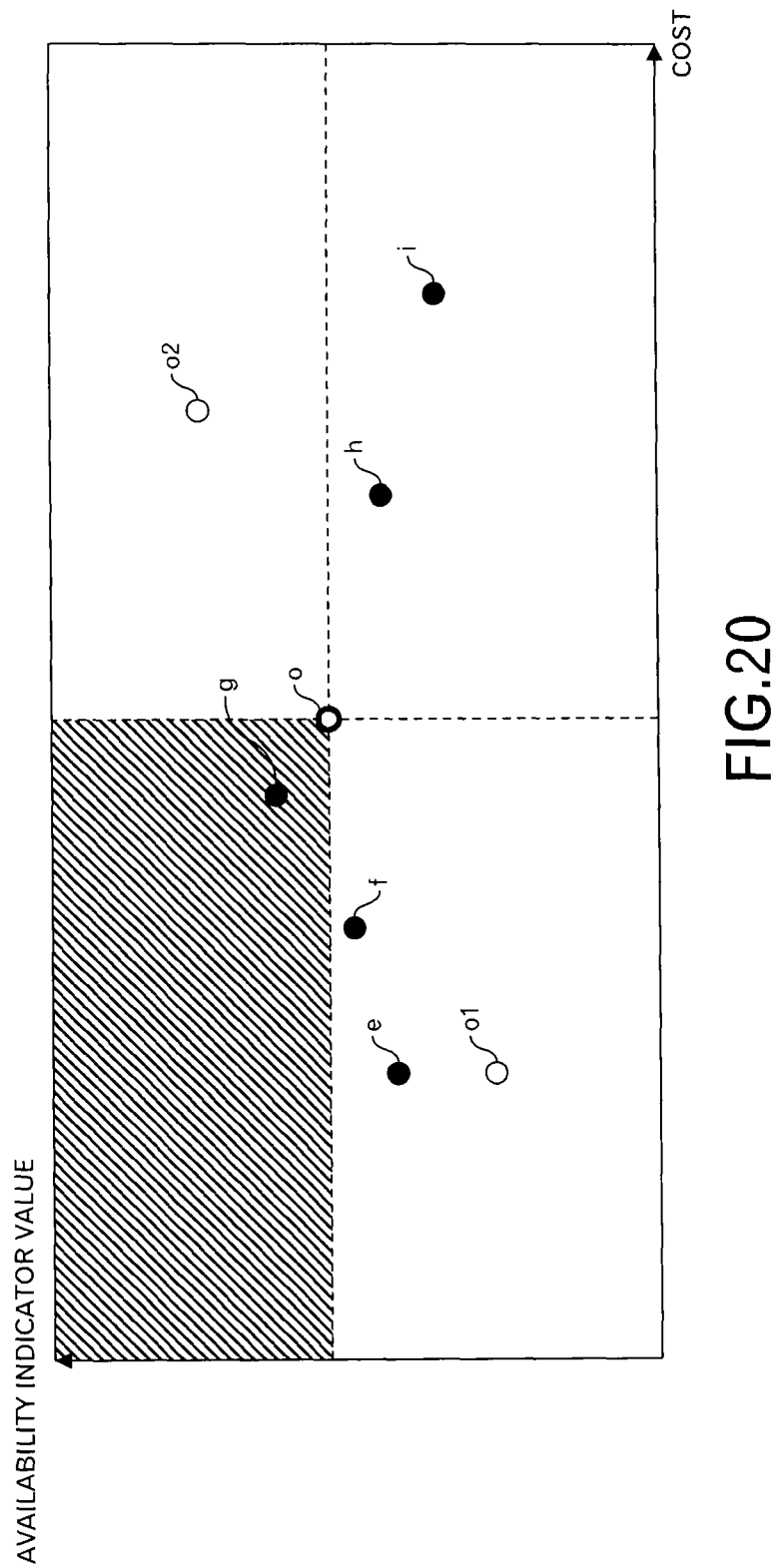
FIG. 20 is a diagram depicting an example of a plan mapped by the cost and the availability indicator value.

Then, when the resource combinations are developed after generating the derived templates by applying the plan to the original template, various points such as points e to i in FIG. 20 are obtained. Then, the resource combination of the derived template whose cost is lower than that of the point o and whose availability indicator value is greater than that of the point o may be obtained like the point g. In the aforementioned processing, such a result is expected.

As described above, in addition to the derived templates, the resource combinations may be developed also for the original template, and then the aforementioned processing may be executed for the resource combinations of the original template in addition to the derived templates.

Although this embodiment of this invention was explained above, this invention is not limited to this embodiment. For example, the functional block configuration of the information providing apparatus 100 illustrated in FIG. 3 does not correspond to a program module configuration and file configuration. Moreover, as for the processing flow, as long as the processing results do not change, the turns of the steps may be exchanged or plural steps may be executed in parallel.

Furthermore, the functions of the information providing apparatus 100 may be implemented by plural computers and the information providing apparatus 100 may be implemented by a stand-alone type computer that is managed by a certain user.

Moreover, an example that the availability indicator value is used as the non-functional viewpoint was explained above, however, other performance indicator values may be employed. For example, the throughput may be considered.

Figure 21:
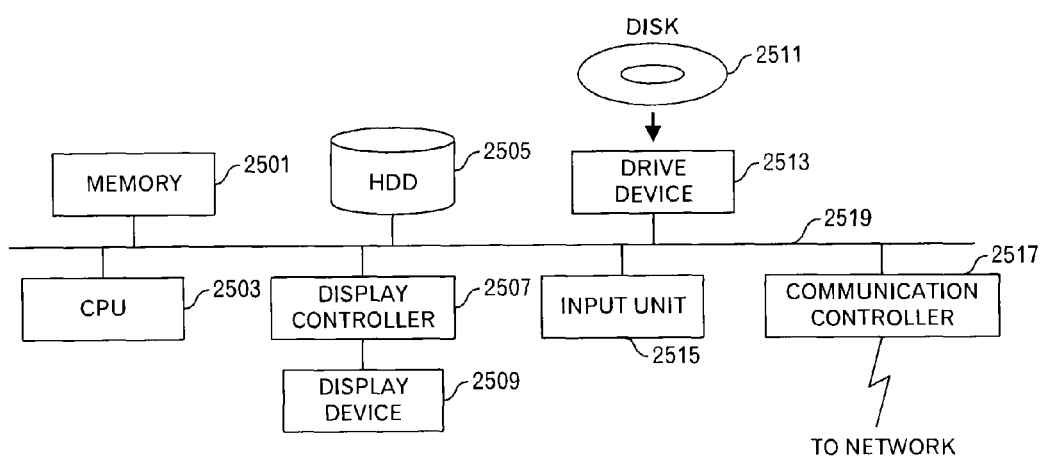
FIG. 21 is a functional block diagram of a computer.

In addition, the aforementioned information providing apparatus 100 is a computer device as shown in FIG. 21. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as shown in FIG. 21. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

Aforementioned embodiments are outlined as follows:

An information providing method relating to this embodiment includes (A) obtaining a template that defines one or more functions to be used; (B) extracting plural combinations that are used to implement the one or more functions, which are defined in the obtained template, from a data storage unit that stores, for each of computer resource providing services (e.g. clouds) that provide one or plural functions, a performance indicator value for each of the one or plural functions, wherein each of the plural combinations includes a computer resource providing service and one or more functions in the computer resource providing service; (C) calculating, for each of the extracted plural combinations, a performance indicator value for the combination based on data in the data storage unit; and (D) outputting, for at least one of the extracted plurality of combinations, the computer resource providing service, the one or more functions in the computer resource providing service, and the calculated performance indicator value.

Accordingly, it becomes possible to select the computer resource providing service and its functions from the non-functional viewpoint such as a performance indicator value (e.g. availability indicator value).

Moreover, a resource condition may be defined for each of the functions. In such a case, the extracting may include (b1) selecting a computer resource providing service that includes a function whose resource condition satisfies a resource condition defined for a function defined in the obtained template. Hence, it becomes possible to certainly implement functions defined in the template.

Furthermore, the obtaining may include: (a1) receiving data that includes functional information, which defines one or more functions to be used, and one or more deployment plans, wherein each of the one or more deployment plans defines a deployment method of the one or more functions to be used; and (a2) generating plural templates by combining the functional information and the one or more deployment plans. Hence, the possibility that a preferable resource combination is found out among variations of a system that the user assumed becomes high.

Furthermore, the data storage unit may further store a cost for each of the one or plural functions. In such a case, the aforementioned information providing method may further include: (E) calculating, for each of the extracted plural combinations, a cost for the combination based on the cost in the data storage unit. In addition, the aforementioned outputting may include: (d1) extracting, from the extracted plural combinations, a combination whose calculated cost is equal to or less than a reference value and whose calculated performance indicator value is the same as or higher than a predetermined reference. Accordingly, it becomes possible to obtain a combination whose cost and performance indicator value are equal to or higher than reference levels.

The reference value of the cost may be a cost designated by a user or a cost for a computer resource providing service that is currently used, and the predetermined reference may be a value designated by the user or a value for the computer resource providing service that is currently used.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information providing method, comprising:
obtaining, by using a computer, a template that defines one or more functions to be used;
extracting, by using the computer, a plurality of combinations of computer resources that are provided by one or plural computer resource providing services among a plurality of computer resource providing services and are used to implement the one or more functions which are defined in the obtained template, from a data storage unit that stores, for each of the plurality of computer resource providing services, a performance indicator value for each of one or plural computer resources that are provided by the computer resource providing service;
calculating, by using the computer and for each of the extracted plurality of combinations, a performance indicator value for the combination based on data in the data storage unit; and
outputting, by using the computer and for each of one or plural combinations of the extracted plurality of combinations, computer resources that are included in the combination, computer resource providing services that provide the computer resources that are included in the combination, a performance indicator value calculated for the combination, and a difference between the performance indicator value calculated for the combination and a predetermined reference used for extracting the one or plural combinations from the extracted plurality of combinations.

2. The information providing method as set forth in claim 1, wherein a resource condition is defined for each of the one or more functions which are defined in the obtained template, and
the extracting comprises selecting, for each of the one or more functions which are defined in the obtained template, one or plural computer resources that satisfy a resource condition defined for the function.

3. The information providing method as set forth in claim 1, wherein the obtaining comprises:
receiving data that includes functional information, which defines one or more functions to be used, and one or more deployment plans, wherein each of the one or more deployment plans defines a deployment method of the one or more functions to be used; and
generating a plurality of templates by combining the functional information and the one or more deployment plans.

4. The information providing method as set forth in claim 1, wherein the data storage unit further stores, for each of the plurality of computer resource providing services, a cost for each of one or plural computer resources that are provided by the computer resource providing service,
the information providing method further comprises calculating, by using the computer and for each of the extracted plurality of combinations, a cost for the combination based on costs for computer resources that are included in the combination, which are stored in the data storage unit, and
the outputting comprises extracting, from the extracted plurality of combinations, a combination whose calculated cost is equal to or less than a reference value and whose calculated performance indicator value is the same as or higher than the predetermined reference.

5. The information providing method as set forth in claim 4, wherein the reference value is a cost designated by a user or a cost for a combination of computer resources that are currently used, and
the predetermined reference is a value designated by the user or a value for the combination of computer resources that are currently used.

6. A non-transitory computer-readable storage medium storing a program that causes a computer to execute a process, the process comprising:
obtaining a template that defines one or more functions to be used;
extracting a plurality of combinations of computer resources that are provided by one or plural computer resource providing services among a plurality of computer resource providing services and are used to implement the one or more functions which are defined in the obtained template, from a data storage unit that stores, for each of the plurality of computer resource providing services, a performance indicator value for each of one or plural computer resources that are provided by the computer resource providing service;
calculating, for each of the extracted plurality of combinations, a performance indicator value for the combination based on data in the data storage unit; and
outputting, for each of one or plural combinations of the extracted plurality of combinations, computer resources that are included in the combination, computer resource providing services that provide the computer resources that are included in the combination, a performance indicator value calculated for the combination, and a difference between the performance indicator value calculated for the combination and a predetermined reference used for extracting the one or plural combinations from the extracted plurality of combinations.

7. An information providing apparatus, comprising:
a memory; and
a processor coupled to the memory and configured to:
obtain a template that defines one or more functions to be used;
extract a plurality of combinations of computer resources that are provided by one or plural computer resource providing services among a plurality of computer resource providing services and are used to implement the one or more functions which are defined in the obtained template, from a data storage unit that stores, for each of the plurality of computer resource providing services, a performance indicator value for each of one or plural computer resources that are provided by the computer resource providing service;
calculate, for each of the extracted plurality of combinations, a performance indicator value for the combination based on data in the data storage unit; and
output, for each of one or plural combinations of the extracted plurality of combinations, computer resources that are included in the combination, computer resource providing services that provide the computer resources that are included in the combination, a performance indicator value calculated for the combination, and a difference between the performance indicator value and a predetermined reference used for extracting the one or plural combinations from the extracted plurality of combinations.

* * * * *